United States Patent [19]
Muller

[11] 3,854,895
[45] Dec. 17, 1974

[54] PROCESS FOR PRODUCING A METHANE-RICH GAS USABLE IN PLACE OF NATURAL GAS

[75] Inventor: Wolf-Dieter Muller, Nieder-Eschbach, Germany

[73] Assignee: Metallgesellschaft Aktiengesellschaft, Frankfurt am Main, Reuterweg, Germany

[22] Filed: Nov. 15, 1972

[21] Appl. No.: 306,651

[30] Foreign Application Priority Data
Mar. 16, 1972 Germany............................ 2212700

[52] U.S. Cl.................... 48/206, 48/197 R, 48/202, 260/449 M
[51] Int. Cl. .............................................. C10j 3/16
[58] Field of Search.......... 48/197 R, 200, 201, 202, 48/206, 210; 260/449 M; 62/17

[56] References Cited
UNITED STATES PATENTS
| | | | |
|---|---|---|---|
| 2,863,527 | 12/1958 | Herbert et al. | 62/17 |
| 3,511,624 | 5/1970 | Humphries et al. | 48/197 R |
| 3,728,093 | 4/1973 | Cofield | 48/197 R |

OTHER PUBLICATIONS
H. A. Dirksen and H. R. Linden, "Pipeline Gas From Coal . . . ," Inst. Gas Technol. Res. Bull. 31 (July 1963) pgs. 4–7.
Gas Engineers Handbook 1965, The Industrial Press, 93 Worth Street, New York, N.Y., pg. 3/117.

Primary Examiner—S. Leon Bashore
Assistant Examiner—Richard Pace
Attorney, Agent, or Firm—Burgess, Dinklage & Sprung

[57] ABSTRACT

A methane-rich gas which can be used in place of natural gas is produced by
a. producing a primary gas by the pressure gasification of coal with steam and oxygen;
b. dividing the primary gas into two streams;
c. converting the carbon monoxide content of one of said streams with steam to carbon dioxide and hydrogen and thereafter washing out the carbon dioxide;
d. purifying said streams by removing catalyst poisons;
e. catalytically hydrogenating the converted gas stream from (c) to a gas consisting essentially of hydrogen, methane and water vapor;
f. passing the gas stream from (e) through a plurality of successive layers of a methanation catalyst and reacting same in each successive layer with a portion of the other of the gas streams from (b).

13 Claims, 4 Drawing Figures

PROCESS FOR PRODUCING A METHANE-RICH GAS USABLE IN PLACE OF NATURAL GAS

BACKGROUND

This invention relates to a process for producing a methane-rich gas that can replace natural gas, or be mixed with it without changing its properties.

Gases to replace natural gas should consist of pure methane insofar as possible. They must contain at least 88 percent methane by volume, be free of carbon monoxide and contain less than 2 percent hydrogen by volume. Inert components may be nitrogen, carbon dioxide and, in traces, argon.

The oxides of carbon have been hydrogenated on catalysts containing metals of the 8th Group of the Periodic System, especially of the iron group and platinum group, to produce liquid hydrocarbons or methane according to the catalyst used and the conditions of the reaction.

In a process known as the Fischer-Tropsch symthesis, liquid hydrocarbons are prepared by the hydrogenation of carbon monoxide at temperature under 260°C and pressures of 2 to 10 atmospheres gauge, on catalysts containing cobalt or iron, from a gas which has been produced, for example, by the hig pressure gasification of carbon with steam and oxygen and has been carefully purified. The loading of the catalyst is so chosen, with the strict maintenance of narrow temperature limits, that the formation of methane, which occurs as a secondary reaction, is largely suppressed. The reaction heat that is liberated is removed by charging the catalyst into tubes of small diameter which are surrounded by a coolant which boils under pressure.

The hydrogenation of carbon monoxide to form methane on catalysts containing nickel or platinum is one of the oldest known hydrogenation reactions. In the temperature range of the highly exothermic methanation, however, the formation of free carbon by the Boudouard reaction is possible, and is also promoted by an increasing concentration of CO in the reaction mixture.

It is known from German Pat. No. 364,978 that the formation of carbon black by the Boudouard reaction can be suppressed in the hydrogenation of carbon-monoxide by operating with a high excess of hydrogen.

The hydrogenation of one mole of CO requires three moles of $H_2$, and the hydrogenation of $CO_2$ requires even 4 moles of $H_2$.

In the prior-art process, an $H_2$:CO ratio of at least 5 was used. In the practical performance of the methanation, hydrogen or a hydrogen-rich gas, such as coke-oven gas, is passed through a series of reactors filled with a catalyst containing nickel, and prior to each reaction enough CO or CO-rich gas such as water gas, is fed into this hydrogen-rich gas to present the $H_2$:CO ratio from dropping lower than 5. After each of these reactors the water vapor contained in the emerging gas is condensed out by cooling. If the high excess of hydrogen is sustained in all stages until the carbon monoxide is fully reacted, the product gas cannot contain pure methane but only a mixture of methane and hydrogen.

To properly control the positive heat effect in the first stages of the reaction, a diluent having an inert behavior is added to the reaction mixture, especially the methane that is produced in the process itself.

The use of the produced methane as an inert diluent results in a single-step process in which reaction product, freed of water vapor by cooling, is kept circulating through a catalyst bed into which there is fed an $H_2$ + CO mixture in which the ratio of $H_2$ to CO may be lower than 5, but not lower than 3. By increasing the ratio of recirculating gas to fresh gas the percentage of residual hydrogen in the reaction product can be reduced.

Such residual concentrations of hydrogen can be eliminated according to German Pat. No. 366,791 by catalytic reaction with oxygen (air) to form water, or with carbon dioxide with the additional formation of methane. Lastly, German Pat. No. 396,115 discloses a method for the hydrogen enrichment, for methanation purposes, of a water gas having an $H_2$:CO ratio of about 1:1, by subjecting the water gas, after the addition of steam, to a conversion reaction in which carbon monoxide reacts with water vapor to form carbon dioxide, the gas being delivered to the methanation process after desulfuration.

The manufacture of a synthetic natural gas consisting mainly of methane is increasingly important because a gaseous fuel of high heat value has many advantages over solid and liquid fuels in regard to transportability and environmental protection requirements. It burns without solid residue to a sulfur-free exhaust gas and can be distributed to residential and industrial consumers through long-distance gas pipes without danger to the ground water.

The invention relates to a process for the manufacture of a methane-rich gas which is interchangeable with natural gas, from a gas rich in oxides of carbon which is produced by the gasification of coal with steam and oxygen under elevated pressure, and which shall be referred to hereinafter as pressure-gasification gas.

It is in the prior art to manufacture both fuel gases for community fuel supply and synthesis gases containing carbon monoxide and hydrogen by the pressure-gasification of coal. It is also in the prior art to increase the hydrogen content of the pressure-gasification gas through the partial conversion of the carbon monoxide to carbon dioxide and hydrogen by means of steam. Gases produced by the pressure-gasification of coals with steam and, in some cases, oxygen generally contain so much $CO_2$ and CO that the hydrogen present in them is not sufficient for the complete hydrogenation of the carbon monoxide.

In order that all of the CO may be consumed in the methanation, the proportion of hydrogen in the input gas mixture must amount to at least three times the amount of the carbon monoxide. In order to use up also all of the hydrogen in the methanation, the quotient of

$$H_2/3\ CO + 4\ CO_2$$

must not exceed 1.

To fulfill these conditions, a portion of the carbon monoxide contained in the pressure-gasification gas must be converted with water vapor to carbon dioxide and hydrogen. On account of the sensitivity of the preferably nickel methanation catalysts to catalyst poisons, the pressure-gasification gas must undergo a very careful purification to completely remove not only the sulfur compounds $H_2S$ and COS and the organic sulfur compounds always contained in coal distillation gases but also tars and oils. Partially unsaturated vaporous or gaseous hydrocarbons as well as phenols and fatty acids are included among the tarry substances. Other gaseous impurities are ammonia and hydrocyanic acid.

For the purification of pressure gasification gas to the degree of purity required for synthesis gas by means of the absorption process, organic, polar, preferably water-soluble substances have proven to be effective physically acting absorbing agents, especially methanol, which is used at temperatures below −20°C.

SUMMARY

It has been found that, for the transformation of a pressure gasification gas to a synthetic natural gas, it is advantageous to divide the pressure gasification gas into two streams which are purified individually, causing one of these streams to react by conversion of the CO contained therein with water vapor to $CO_2$ and $H_2$, wash out the $CO_2$, and hydrogenate the remaining oxides of carbon so as to form a gas consisting essentially of hydrogen, methane and water vapor, and cause this gas to react with the other stream which is rich in CO and $CO_2$. For this reaction, the stream that is rich in $H_2$ and nearly free of $CO_2$ and CO is passed through several layers of a methanation catalyst, and a portion of the other stream rich in CO and $CO_2$ is added to it ahead of each layer.

The process of the invention broadly comprises the steps of:

a. producing a primary gas by the pressure gasification of claim with steam and oxygen;
b. dividing the primary gas into two streams;
c. converting the carbon monoxide content of one of said streams with steam to carbon dioxide and hydrogen and thereafter washing out the carbon dioxide;
d. purifying said streams by removing catalyst poisons;
e. catalytically hydrogenating the converted gas stream from (c) to a gas consisting essentially of hydrogen, methane and water vapor;
f. passing the gas stream from (e) through a plurality of successive layers of a methanation catalyst and reacting same in each successive layer with a portion of the other of the gas streams from (b).

DESCRIPTION OF THE DRAWINGS

The drawings represent flow diagrams of installations for carrying out the process of the invention which are given by way of example.

DESCRIPTION

Figure 1:
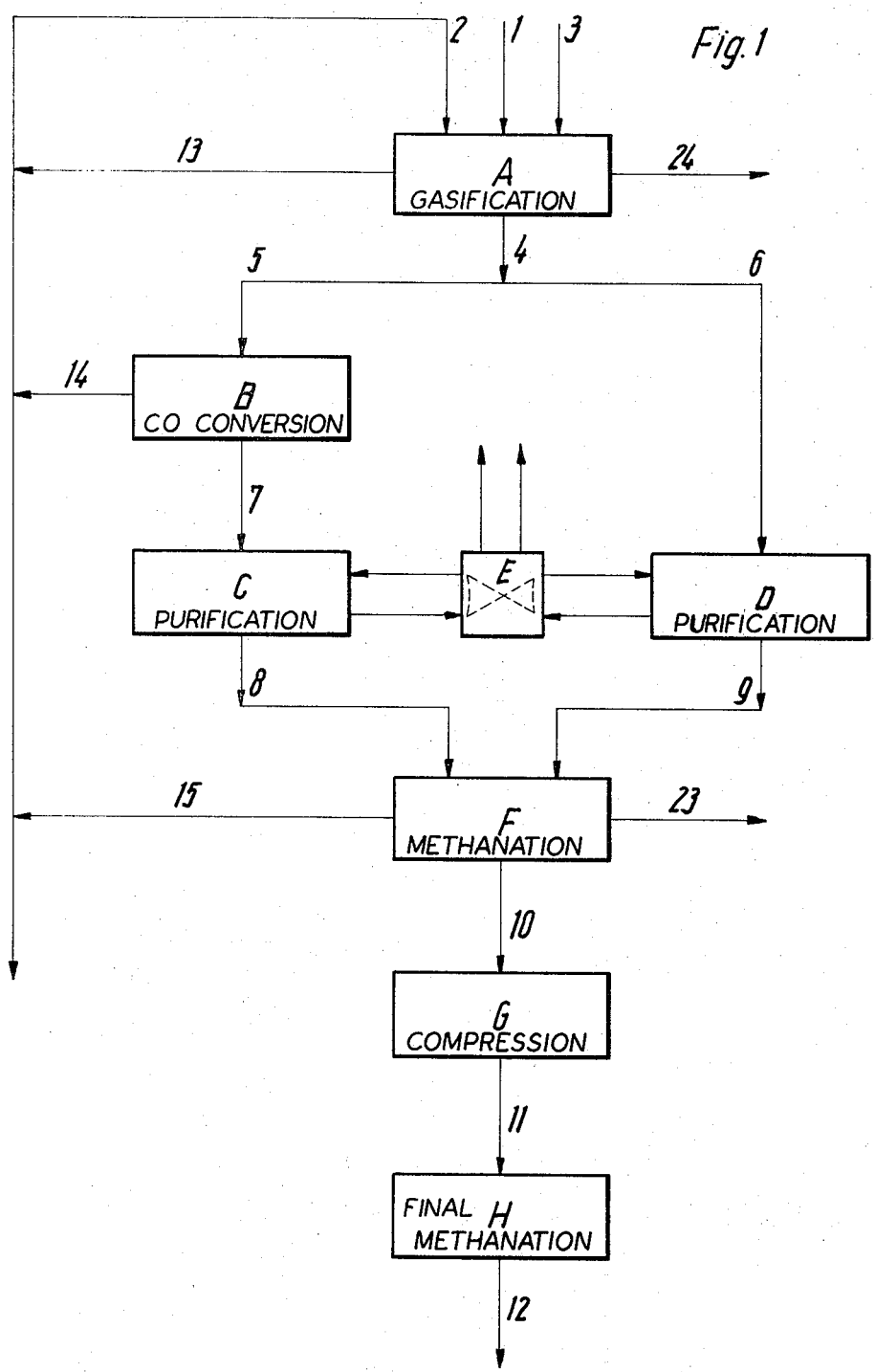
FIG. 1 is an over-all flow diagram of a complete plant including the pressure gasification stage and the shift conversion of a partial stream of raw gas.

The ratio of the partial stream that is to be converted to the other partial stream is best made to be between 5:1 and 1:1, preferably between 3:1 and 1.2:1.

The two partial streams are separately purified, especially desulfurized, a residual $CO_2$ concentration in the converted partial stream of less than 3 volume-percent being established, while the $CO_2$ concentration in the other stream is varied only slightly. With due consideration for the residual $CO_2$ concentration in the washed convert gas stream, the ratio of the two partial streams is not varied or advantageously adjusted so that the sum of the compositions of the two streams complies with the condition that $H_2/3 CO + 4 CO_2 = 0.96$ to $0.99$.

The two partial streams of the pressure gasification gas are purified separately from one another. The purification which serves for the removal of catalyst poisons, especially sulfur compounds, is preferably performed by washing with organic, polar, physically solvent absorbing agents at ambient temperature to temperatures of about −50°C. Diemethyl formamide, butyrolactone, sulfolanes, N-methylpyrrolidone and propylene carbonate are examples of absorbing agents which can be used at ambient temperatures.

Methanol is preferred as the absorbing agent for the purification of the two streams at temperatures below 0°C. The gas streams treated in this manner are then also dried simultaneously. This makes it possible in the methanation process to leave all or at least most of the water vapor formed by the methanation reaction in the reaction mixture between the reaction stages of the two streams and save the cost of a number of heat exchangers of considerable size.

The methanation of both partial streams is performed on hydrogenation catalysts containing elements of the iron group and/or platinum group, i.e., iron, cobalt, nickel, platinum, palladium and the like, on a ceramic, heat-resistant and water-vapor-proof support material. Particularly suitable are catalysts containing nickel which contain aluminum oxide, aluminum silicate or magnesium silicate as support material. Many of the suitable catalysts are commercially available.

The reaction heat from the methanation can be removed by passing the reaction mixture emerging from each catalyst layer, prior to the admixture of the gas rich in CO and $CO_2$, through a heat exchanger where it is cooled by the evaporation of water boiling under pressure. Another method of cooling consists in performing the methanation in tubular reactors containing the catalyst in tubes surrounded by a coolant, especially water, boiling under pressure. A contribution is made to the cooling of the reaction mixture by mixing the hydrogen-rich partial stream or the reaction mixture, as the case may be, with the portions of the partial stream that is rich in CO and $CO_2$ while the latter are cold, say, at the ambient temperature or even lower. On the other hand, the reaction conditions, especially the hydrogen content and the temperature of the entering reaction mixture, can be influenced by placing a layer of a catalyst which brings about the conversion of carbon monoxide with steam to carbon dioxide and hydrogen ahead of one, several or all of the catalyst beds. The conversion reaction will increase the hydrogen content and raise the temperature, on the one hand, and on the other hand it will reduce the carbon monoxide and water vapor contents.

Referring now to the drawing, the complete plant of FIG. 1 consists of the pressure gasification apparatus, A, the carbon monoxide conversion apparatus B, the two gas purification stages C and D with their common regeneration system E, a first methanation stage F, a compression stage G, and a final methanation stage H.

The pressure gasification apparatus A includes the actual pressure gasifier and the immediately adjoining system for direct cooling in a washing condenser, followed by indirect condensers in the form, for example, of waste-heat boilers.

The converter system B is advantageously constructed in the form of a raw gas converting system as described in U.S. Pat. Nos. 3,069,249 and 3,069,250 for which the raw gas is cooled only down to the vicinity of the dewpoint and is separated from the condensate so that the excess water vapor still present after the pressure gasification will be utilized.

The two gas purifying systems C and D include gas condensers in which the gas, still containing the medium oils and light oils of the tar, is cooled down to the ambient temperature, the oils and water vapor being removed as condensate. The actual purification of the gas is performed in both of the partial streams of the gas by washing with methanol at temperatures of about −30°C. using a procedure known as the "Rectisol Process" and described in U.S. Pat. No. 2,863,527. The two gas purification systems C and D are of a two-stage construction, so that a selective desulfurization can be carried out in the first stage with only a slight absorption of $CO_2$. The absorption stages C and D have a common regeneration system E.

Different embodiments of the methanation stage can be described as follows with reference to FIGS. 2 to 4.

The reaction product from methanation stage F, after cooling with the condensation of water vapor, can be compressed by means of the compressor G to the desired discharge pressure, e.g., to 60 atmospheres, and can then be carried through the final methanation stage H for the purpose of converting any remaining carbon dioxide and hydrogen completely to methane, at a high pressure to promote the reaction.

Referring again to FIG. 1, coal is introduced through input 1 which is in the form of a presure lock, and the gasification agents, steam and oxygen, are fed through lines 2 and 3 into the pressure gasifier A. High-pressure steam produced in the pressure gasifiers is brought out through line 13 and part of it is returned to line 2 as a gasification agent. An ash discharge 24 is shown, which is also in the form of a pressure lock.

The raw pressure gasification gas from A is cooled in cooling systems (not shown) down to about 200°C. After separation of the condensates the raw gas emerges through line 4 and is divided between line 5 and 6.

The partial stream going to the shift converter B through line 5 is further enriched with water vapor if desired, and then reacted in a known manner on a cobalt-molybdenum catalyst at about 350° to 450°C, thereby achieving a residual concentration of CO of about 4 percent by volume. The excess heat from the CO conversion in B is carried out through line 14 in the form of high-pressure steam. The converted gas then passes through line 7 to the converted gas purification system C in which it is cooled, the condensate containing tar oil and water is removed, and the gaseous impurities and carbon dioxide are washed out. The resulting gas stream in line 8 is the one that is rich in hydrogen and poor in CO and $CO_2$ which passes into the methanation stage F.

The raw gas stream in line 6 is first cooled in gas purification system D down to the ambient temperature, the condensates of tar oil and water being separated, and it is washed with methanol in a two-stage low-temperature washing process so that the impurities are completely removed, but the $CO_2$ content is only slightly altered. Then this stream, too, is delivered to the methanation stage F.

The reaction heat from the formation of methane is removed from the methanation system through line 15 in the form of steam. The methanation system F also includes a cooling system in which water vapor is condensed out of the immediate reaction product. The discharge of the condensate is marked 23. The methane-rich gas then remaining is raised to a higher pressure in the compression stage G and then delivered through line 11 to the final methanation system H in which residual CO, $CO_2$ and $H_2$ can be reacted to methane if an especially high methane content is desired in the end product delivered through line 12.

Figure 2:
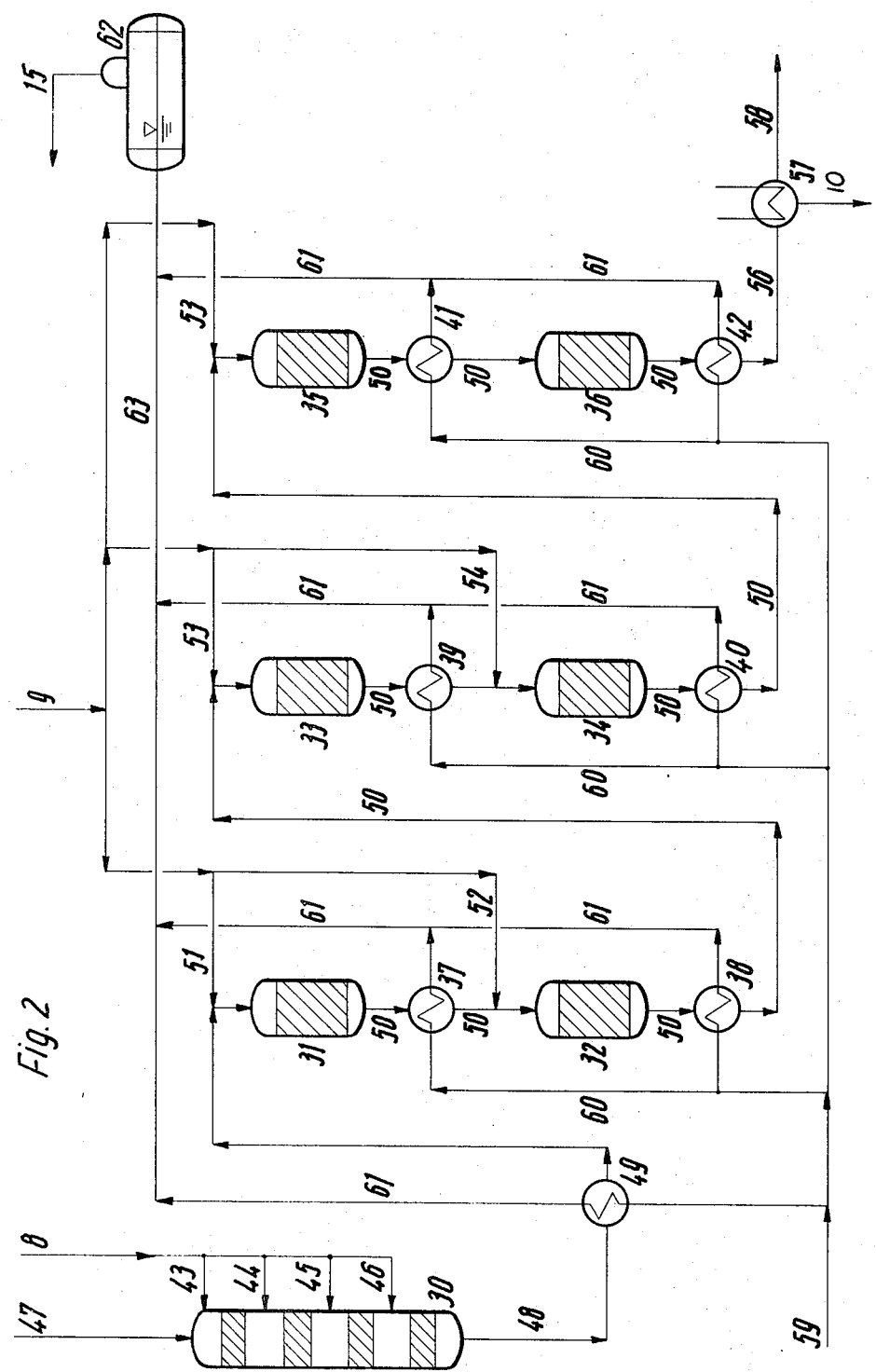
FIGS. 2 to 4 are flow diagrams of several embodiments of the methanation stage F of FIG. 1.

The methanation system F shown in FIG. 2 includes a reactor 30 for the methanation of the hydrogen gas-rich converted gas stream and of shaft reactors 31, 32, 33, 34, 35 and 36 connected in tandem, in which the two partial streams 8 and 9 are progressively brought to reaction. Each of the reactors 31-36 is followed by condensing systems 37 to 42, which may include in a known manner a feed water preheater and a waste-heat boiler.

The reactor 30 contains a plurality of catalyst layers between which gas can be introduced in a known manner. The partial stream of pressure-gasified gas from line 8 (FIG. 1), enriched with hydrogen by the CO conversion and the subsequent washing out of carbon dioxide, is introduced into reactor 30 in portions above the catalyst layers through the branch lines 43, 44, 45 and 46. The first portion from line 43 is raised to the start-up temperature of the first catalyst layer by admixture with superheated steam from line 47, and is further heated by the heating effect of the methanation. The reaction product from the first catalyst layer is further reacted by admixture with additional cold gas and the reaction of this mixture on the following catalyst layers.

A hot gas consisting of hydrogen, methane and water vapor is discharged from the reactor 30 through line 48 and passed through condenser system 49 to reactor 31. The adiabatic reactors 31 to 36 with the corresponding condenser systems 37 to 42 are in a genuine series arrangement with respect to the gas stream from 48. The connecting lines are assigned reference number 50 all the way through.

The purified pressure gasification gas coming in through line 9 from the gas purification system D (FIG. 1) is divided up among the first five reactors through the branch lines 51, 52, 53, 54, and 55 and is admixed with the cooled, hydrogen rich gas (line 48) in the one case and with the hydrogen-rich reaction product (line 50) in the others. In the last reactor 36, the reaction product from reactor 35, after passing through the cooling system 41, is finally reacted without further addition. The end product is carried from the last cooling system 42 through line 56 to the final condenser 57 where the water vapor is removed through 58, and thence through line 10 (FIG. 1) to the compressor system G and to the post-methanation system H or to direct use.

The cooling systems 49 and 37 to 42 are supplied with water from a water main 59 through branch lines 60, and they are connected by risers 61 to steam main 63 leading to a steam drum 62. The high-pressure steam won from the reaction heat of the methanation process is made available from the steam drum 62 through line 15 (FIG. 1).

Figure 3:
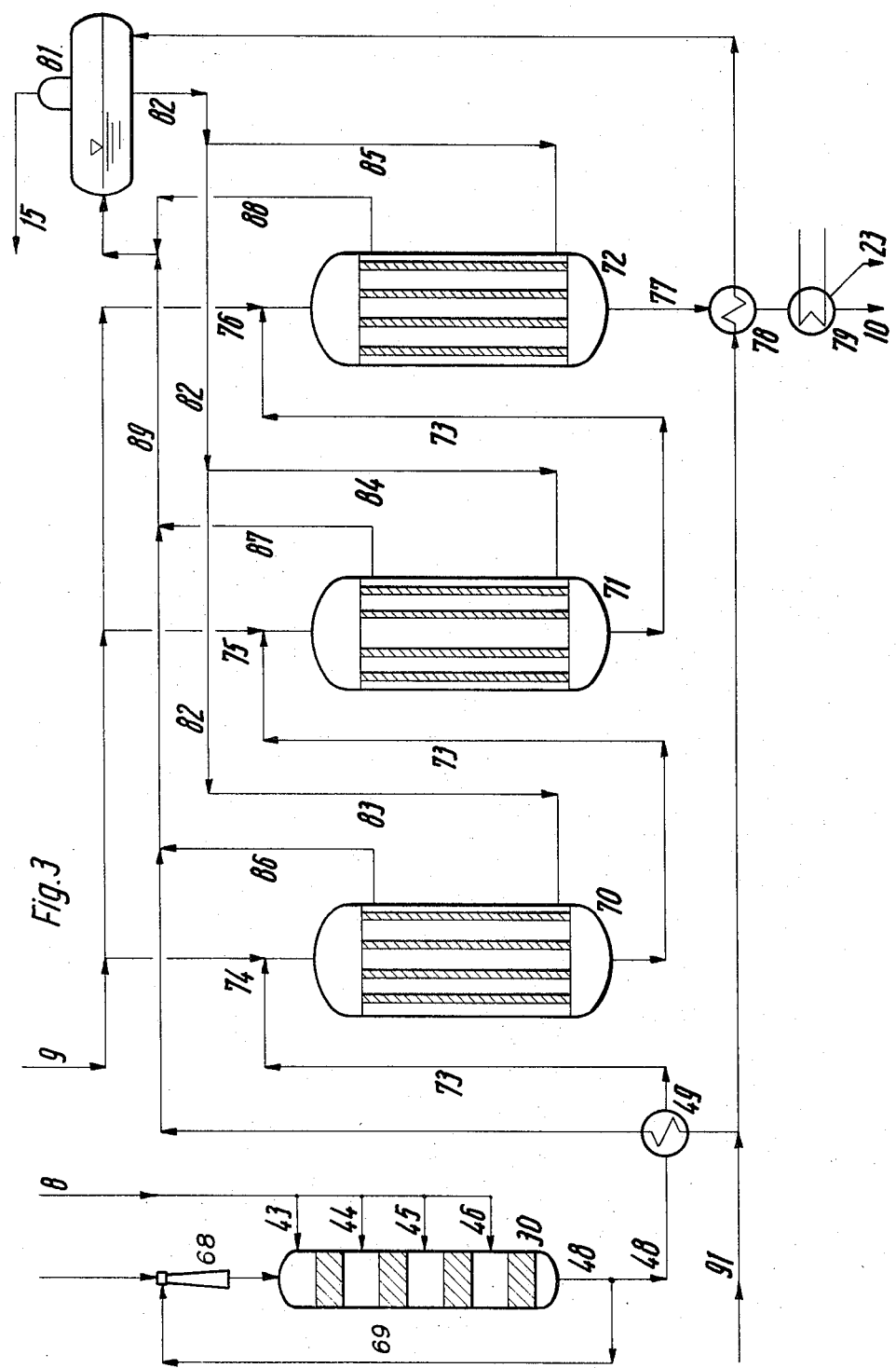

FIG. 3 illustrates an embodiment of the methanation system F (FIG. 1) in which the reaction of the two partial streams 8 and 9 is performed on indirectly cooled catalysts disposed in tubular reactors.

With regard to the methanation of the hydrogen rich converted gas stream 7, the system is the same as the one in FIG. 2 and the same reference numbers have been used.

The shaft reactor 30 contains a plurality of catalyst layers above which a portion of the hydrogen-rich convert gas stream from line 8 is introduced through branch lines 43, 44, 45 and 46. The portion introduced through the topmost catalyst layer is heated to the start-up temperature of the catalyst by admixture with hot reaction product from the reactor. A portion of this reaction product is aspirated through line 69 by means of the steam diffusion pump 68 and delivered to the heat of the reactor. The other portion of the reaction product is delivered through line 48 to cooling system 49 and then to the first tubular reactor 70. Tubular reactors 70, 71, 72 are connected in series and the connecting line is identified by reference number 73 throughout.

Purified pressure gasification gas brought in through line 9 (FIG. 1) is divided among the three tubular reactors 70–72 through the branch lines 74, 45, 76. From the last tubular reactor 72 the end product is carried in line 77 through a heat exchanger 78 to the final condenser 79 where it is cooled with the condensation of water vapor which is removed through line 23. Lastly, it is carried through line 10 to the compressor system G and to the post-methanation system H, or to direct use.

The reaction heat from the methanation is absorbed from the three tubular reactors 70–72 by cooling water which is kept circulating through the cooling jackets of the reactors and a steam drum.

The water flows from steam drum 81 in main line 82 through down pipes 83, 84, 85 into reactors 70–72 at the bottom ends of the cooling jacket and returns from the upper ends of the cooling jacket through risers 86, 87, 88 and main line 89 to the steam drum 81. The reaction heat from the methanation is recovered in the form of high-pressure steam which is taken from the steam drum 81 through the line 15. The feed water is delivered from line 91 through the heat exchangers 49 and 78 to the steam drum 81, some of it directly and some of it through the main return line 89.

Figure 4:
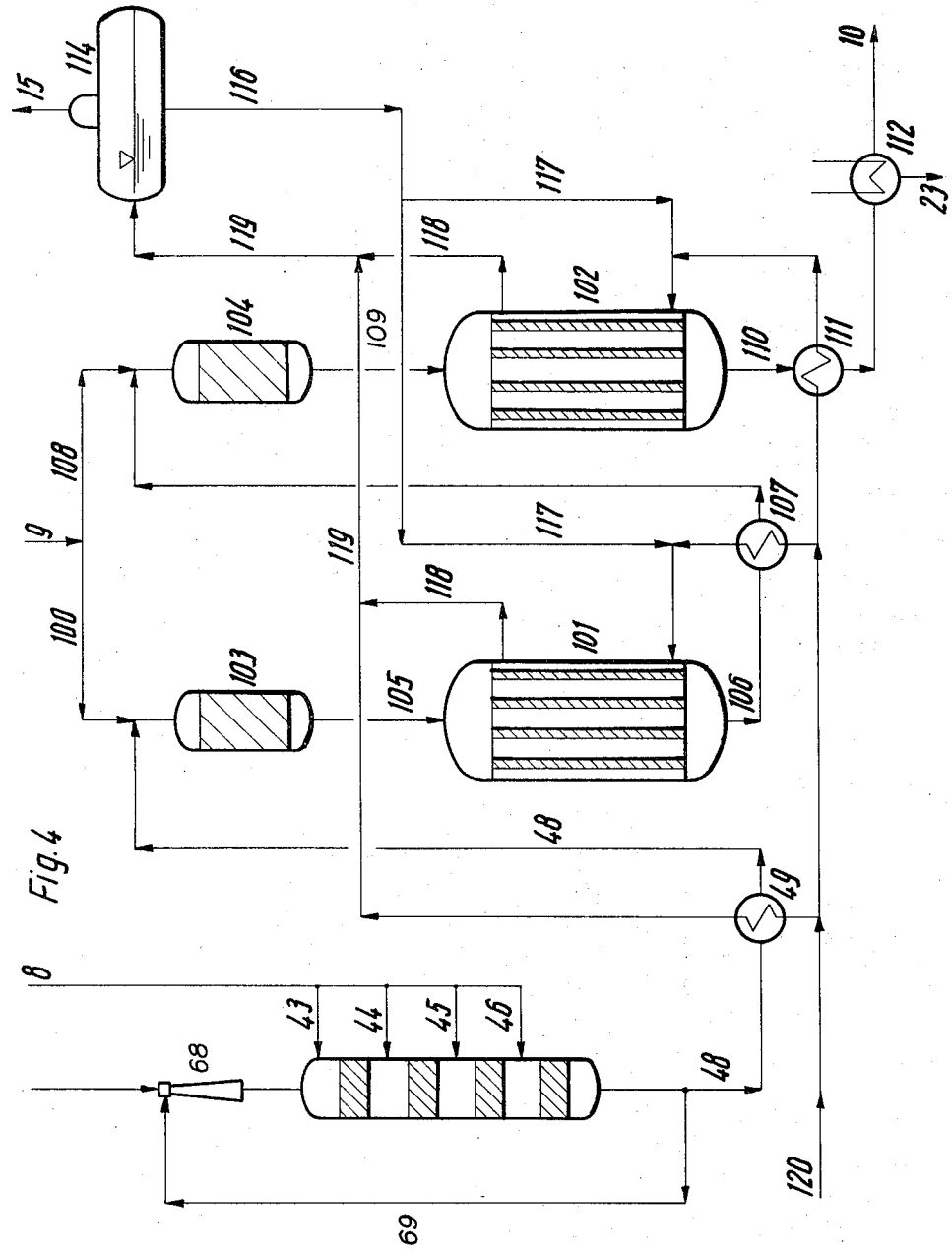

The embodiment of the methanation process F (FIG. 1) illustrated in FIG. 4 is the same as FIGS. 2 and 3 in regard to the methanation of the hydrogen-rich converted gas stream 8, and to this extent the same reference numbers have been used.

The hydrogen-rich converted gas stream from line 8 is divided among the catalyst layers in reactor 30 by means of the branch lines 43, 44, 45, 46, in the same manner described above for FIG. 2. The uppermost portion is raised to the reaction temperature by admixture with hot reaction product from line 69 by means of the steam diffusion pump 68. The methanized convert gas is carried through line 48 and the cooling system 49 to a point where it is mixed with a partial stream of the purified pressure gasification gas from line 9 (FIG. 1) in branch line 100.

The reaction of the methanized convert gas with the purified pressure gasification gas is performed in two tubular reactors 101 and 102. Ahead of each of these reactors are placed shaft reactors 103, 104. Reactors 103 and 104 contain a catalyst which brings about the conversion of CO with water vapor to $CO_2$ and hydrogen. In these reactors, the contents of $H_2$ and $CO_2$ in the mixture of methanized convert gas from 8 and purified pressure gasification gas from is increased along with the temperature increase, and the content of CO is diminished.

The reaction mixture flows through line 105 from the first conversion reactor 103 into the tubular reactor 101. The methane-richer reaction mixture flowing from there is carried through line 106 and the heat exchanger 107 and, after being combined with the rest of the purified pressure gasification gas from line 9 and branch line 108, through the second conversion reactor 104 and line 109 into the second tubular reactor 102. After the reaction of the mixture in the latter, the mixture is carried through line 110 and the heat exchanger 111 to the final condenser 112, from which, after cooling with the condensation of water vapor which is removed through line 23, it is delivered through line 10 to the compressor system G and the post-methanation system H (FIG. 1), or to direct use.

The reaction heat of the methanation is absorbed by water which is continuously circulated through steam drum 114 and the cooling jackets of the tubular reactors 101 and 102, and is recovered as high-pressure steam in line 15 coming from the steam drum 114. The cooling water circuit runs from the steam drum 114 through the main pipe 116, the down pipes 117, the cooling jackets of the tubular reactors 101 and 102, the risers 118 and the main line 119 back to the steam drum 114. Feed water from line 120 is distributed through heat exchangers 49, 107, 111, to the down pipes 117 and the risers 118 of the water circuit.

In the described embodiments of the methanation, the gases entering the methanation systems are substantially dry, and the partial stream that is rich in CO and $CO_2$ is also available cold from the gas purification system. When the two partial streams are mixed, a sufficient excess of hydrogen is present in each case, and the water vapor concentration appreciably exceeds the equilibrium value of the methane reaction. Under these conditions the removal of the high heat of formation of the methane is easy to accomplish.

The ratio between the amounts of the raw primary gas that are distributed to lines 5 and 6 from line 4 (FIG. 1) is preferably adjusted such that the two streams together contain the oxides of carbon and hydrogen virtually in the stoichiometric quantities needed for the formation of methane. The excess of $CO_2$ resulting from the pressure gasification of the coal is washed out prior to the methanation.

The ratio between the two streams may be such that, in their sum, the ratio $H_2/3 CO + 4 CO_2$ is greater than 1. In that case a corresponding $CO_2$ concentration will appear in the product gas from the final methanation. Use is made of this possibility in order to fulfill conditions required in individual cases, e.g., in regard to heat value and density. Since in the washing of $CO_2$ from the product gas only a separation of $CO_2$ and methane needs to be performed, an especially pure $CO_2$ can be recovered in this manner.

The following examples will serve for a more detailed explanation of the invention.

The examples are based on a gas produced by the pressure distillation of a mineral coal with steam and oxygen under a pressure of 30 atmospheres, which after cooling and the separation of condensate has the following composition on a dry basis:

| | |
|---|---|
| $CO_2$ | 28.2 vol-% |
| $CO$ | 19.7 do. |
| $H_2$ | 39.2 do. |
| $CH_4$ | 11.2 do. |
| $H_2S$ | 0.3 do. |
| $N_2$, Ar | 1.4 do. |

The numerical data given in the following examples relate in each case to 1,000 normal cubic meters ($Nm^3$) of this gas.

EXAMPLE 1

1,000 $Nm^3$ of the gas produced in the pressure distillation apparatus A, having the above-stated composition, is delivered from line 4 in the system shown in FIG. 1, at a temperature of 180°C and a pressure of 30 atmospheres.

The gas still contains water vapor and condensable light tar oils which are separated in the cooling that is performed in the gas purifying systems C and D.

The gas stream from line 4 is divided into two partial streams, one of which, containing 660 $Nm^3$, is carried through line 5 to the conversion system B, while the other, containing 340 $Nm^3$ flows through line 6 to the gas purification system D.

In the conversion apparatus B, carbon monoxide and water vapor from line 5 are reacted in a known manner on a catalyst containing nickel and molybdenum to produce carbon dioxide and hydrogen, resulting in 763 $Nm^3$ of convert gas under 27.5 atmospheres, having the following composition:

| | |
|---|---|
| $CO_2$ | 38.2 vol-% |
| $CO$ | 3.9 do. |
| $H_2$ | 45.8 do. |
| $CH_4$ | 9.9 do. |
| $H_2S$ | 0.3 do. |
| $N_2$, Ar | 1.2 do. |

This convert gas flows through line 7 to gas purification system C.

In the gas purification systems C and D the two gas streams are separately cooled, washed at temperatures of −40°C after separation of the condensates, and then reheated to the ambient temperature by heat exchange. Of the 763 $Nm^3$ of the convert gas there remains, after the purification in stage C in which the hydrogen sulfide was washed out completely along with all but a small amount of the $CO_2$, 468 $Nm^3$ of gas under a pressure of 26.0 atm, having the following composition:

| | |
|---|---|
| $CO_2$ | 0.5 vol-% |
| $CO$ | 6.3 do. |
| $H_2$ | 76.2 do. |
| $CH_4$ | 15.7 do. |
| $N_2$, Ar | 1.3 do. |

This gas is delivered through line 8 to the methanation system F.

The hydrogenation of the oxides of carbon contained in the two gas streams is performed in the methanation stage F in the following manner: first a gas consisting of hydrogen and methane is produced from the converted gas from line 8, and this gas is then progressively reacted with portions of the pure primary gas from line 9 on methanation catalysts with cooling between each step.

The three embodiments of this methanation process in accordance with FIGS. 2, 3 and 4 are the subject of Examples 2, 3 and 4.

The methane-rich product gases produced in accordance with these embodiments differ only slightly in yield and composition. The yields are between 286 and 292 $Nm_3$ at pressures between 16 and 20 atmospheres absolute and a temperature of 30°C.

The gas analyses vary within narrow limits:

| | |
|---|---|
| $CO_2$ | 2.2 to 2.6 vol-% |
| $CO$ | 0.2 vol-% |
| $H_2$ | 3.8 to 5.8 vol-% |
| $CH_4$ | 90.3 to 92.9 vol-% |
| $N_2$, Ar | 1.1 to 1.3 vol-% |

The gas that is obtained from the methanation system F, cooled to about 30°C, and separated from condensate (line 10) is compressed in compressor G to 33 atmospheres absolute and then, after reheating to 290°C, is passed through the final methanation H from which 278 $Nm^3$ of product gas is finally obtained under a pressure of 30 atmospheres gauge, with the following composition:

| | |
|---|---|
| $CO_2$ | 1.48 vol-% |
| $CO$ | 0.01 do. |
| $H_2$ | 0.71 do. |
| $CH_4$ | 96.66 do. |
| $N_2$, Ar | 1.14 do. |

EXAMPLE 2

In the embodiment of the methanation process in FIGS. 2, the 468 $Nm^3$ of purified convert gas is divided up into portions of 8 percent, 14 percent, 27 percent and 51 percent for methanation in reactor 30, so that portions of 37.3, 65.6, 126.3 and 238.8 $Nm^3$ are allocated to lines 43, 44, 45 and 46.

By the admixture of 30 kg of high-pressure steam of 480°C the first portion is heated to 270°C and delivered into the uppermost catalyst layer. Here the temperature rises to 480°C with a contraction of volume. By mixing in the other portions ahead of each catalyst layer the temperature is dropped back to 270° in each case and raised again by the reaction to 480°. Finally, 370 $Nm^3$ of reaction product emerge from reactor 30 through line 48 at a temperature of 480°C and with the following composition:

| | |
|---|---|
| $H_2$ | 68.7 vol-% |
| $CH_4$ | 30.7 do. |
| $N_2$, Ar | 1.4 do. |

This gas is cooled in cooling system 49 to 300°C and then passed through the reactors connected in series, 31 to 36, and the corresponding condensers 37 to 42, a portion of the purified primary gas from line 9 being added ahead of each reactor and behind the preceding cooling system (lines 51 to 55).

These portions are: 47 $Nm^3$ (16 percent) ahead of reactor 31, 50 $Nm^3$ ahead of reactor 32, 54 $Nm^3$ ahead of reactor 33 and 75 $Nm^3$ ahead of reactor 34. These portions are so proportioned that a temperature rise to about 490°C takes place in each reactor due to the methanation, and is compensated in the next succeeding condensing system by the cooling of the reaction mixture to about 270°C.

325 Nm³ of reaction gas emerges from the second-last reactor 35, at about 470°C, and with the following composition:

| | |
|---|---|
| $CO_2$ | 4.8 vol-% |
| CO | 0.2 do. |
| $H_2$ | 15.2 do. |
| $CH_4$ | 78.8 do. |
| $N_2$, Ar | 1.0 do. |

This gas contains 0.64 Nm³ of water vapor per Nm³. It is cooled back to 270°C in the cooling system 41 and, without the addition of primary gas, it is reacted on the catalyst of the final reactor 36, resulting, after cooling and the separation of the condensate, in 292 Nm³ of reaction gas at about 16 atmospheres absolute, having the following composition:

| | |
|---|---|
| $CO_2$ | 2.7 vol-% |
| CO | 0.02 do. |
| $H_2$ | 5.9 do. |
| $CH_4$ | 90.3 do. |
| $N_2$, Ar | 1.1 do. |

This gas is compressed in the manner described in Example 1 and passed through the final methanation system where it achieves the compositions specified in Example 1.

EXAMPLE 3

In this embodiment, in accordance with FIG. 3, the reaction of the methanized convert gas from line 8 with the purified primary gas from line 9 takes place in the catalyst layers of tubular reactors 70, 71, 72, these layers being indirectly cooled by water boiling under pressure.

The methanation of the convert gas from line 8 is performed in the shaft reactor 30 in the manner described in Example 2, the convert gas being distributed to lines 43 to 46 in the ratio specified in that example.

The preheating of the first portion is in this case performed not by superheated steam alone but mostly by the recirculation of hydrogen-rich product gas from shaft reactor 30 by means of the steam diffusion pump 68. The steam requirement in this case amounts to only 10 kg, which keeps 22 Nm³ of product gas in circulation at a temperature of 480°C. From the 468 Nm³ of convert gas, 370 Nm³ of hydrogen-rich reaction product are obtained at a pressure of 24.5 atmospheres absolute at 480°C, with the following composition:

| | |
|---|---|
| $H_2$ | 68.7 vol-% |
| $CH_4$ | 30.7 do. |
| $N_2$, Ar | 1.4 vol-% |

This gas is cooled in condenser system 49 to 300°C. and then carried in line 73 through the reactors in series 70, 71 and 72. The catalyst layers are cooled by the water boiling at about 280° to 300° under pressure in the reactor jackets. Ahead of each reactor, portions of the pure primary gas from line 9 are added to the gas flowing through. These portions amount to 87 Nm³ = 30 percent for the first reactor 70 (from line 74), 96 Nm³ = 33 percent for the second reactor 71 (from line 75), and 108 Nm³ = 37 percent for the third reactor 73 (from line 76).

The division of the primary gases among only three reactors in relatively large portions is possible because, if the tube diameter is approximately chosen, large amounts of the reaction heat can be effectively removed in the tubular reactors.

The temperature of the reaction mixture is raised too about 300° in each reactor, and falls again to 260° or slightly less due to the admixture of the portion of primary gas. Any preheating to the start-up temperature of the catalyst that may be necessary can be performed in the first catalyst layer.

The reaction product from the final reactor 72, after cooling to ambient temperature and separating the condensate, is 287 Nm³ of gas at a pressure of 18 atmospheres absolute, having the following composition:

| | |
|---|---|
| $CO_2$ | 2.2 vol-% |
| CO | 0.02 do. |
| $H_2$ | 3.8 do. |
| $CH_4$ | 92.9 do. |
| $N_2$, Ar | 1.1 do. |

This gas is compressed in the manner described with reference to FIG. 1, down to the required pressure, and subjected to a post methanation, whereupon it acquires the composition described in Example 1.

EXAMPLE 4

In this example the number of indirectly cooled tubular reactors is reduced to two instead of the three described in connection with Example 3. However, each tubular reactor is preceded by a shaft reactor containing a cupric catalyst to bring about the conversion of carbon monoxide and water vapor to carbon dioxide and hydrogen at temperatures of 200° to 270°. In these reactors the $H_2$ and $CO_2$ contents are increased while the $CO_2$ contents are diminished, and the gas temperature is raised.

The quantity, pressure, temperature and composition of the hydrogen-rich gas produced in reactor 30 by the methanation of the converted gas from line 8 (line 48, cooling system 49) are the same as given in Example 3.

If 370 Nm³ of the hydrogen-rich gas is mixed with 145 Nm³ of the cold, pure primary gas, a temperature of 215°C is established in the mixture flowing through line 48 into shaft reactor 103.

536 Nm³ of gas flow from shaft reactor 103 through line 105 at a temperature of 260°C, this gas having the following composition:

| | |
|---|---|
| $CO_2$ | 8.6 vol-% |
| CO | 2.3 do. |
| $H_2$ | 63.7 do. |
| $CH_4$ | 24.7 do. |
| $N_2$, Ar | 0.7 do. |

The water vapor content amounts to only 0.08 Nm³ at the first tubular reactor 101. After cooling to 260°C, the reaction mixture emerging from this reactor is combined with the remaining 146 Nm³ of the primary gas, whereupon a temperature of 206°C is established. After reaction in the shaft reactor 102, 491 Nm³ of gas is produced, with a temperature of 260°C and the following composition:

| | |
|---|---|
| $CO_2$ | 11.4 vol-% |
| CO | 0.5 do. |
| $H_2$ | 44.2 do. |
| $CH_4$ | 43.1 do. |
| $N_2$, Ar | 0.8 do. |

The water-vapor content amounts to 0.20 Nm³ per Nm³.

The reaction mixture flowing from the reactor 102 is cooled to the ambient temperature in the final cooling system. After separation of the condensate, there remains 287 Nm³ of gas at 18 atmospheres absolute, with the following composition:

| | |
|---|---|
| $CO_2$ | 2.2 vol-% |
| CO | 0.02 vol-% |
| $H_2$ | 3.8 vol-% |
| $CH_4$ | 92.9 vol-% |
| $N_2$, Ar | 1.1 vol-% |

This gas is post-methanized after compression to the required discharge pressure, in the manner represented in FIG. 1 and described in Example 1.

What is claimed is:

1. Process for manufacturing a methane-rich gas usable in place of natural gas which comprises:
   a. producing a primary gas by the pressure gasification of coal with steam and oxygen;
   b. dividing the primary gas into two streams;
   c. converting the carbon monoxide content of one of said streams with steam to carbon dioxide and hydrogen and thereafter washing out the carbon dioxide;
   d. purifying said streams by removing catalyst poisons;
   e. passing said washed, purified and converted stream through a first methanation stage;
   f. dividing the unconverted gas stream from (b) in at least two streams;
   g. cooling the product gas from said first methanation stage (e) and passing it in admixture with the first stream of the unconverted gas stream from (f) through a second methanation stage;
   h. cooling the product gas from said second methanation stage (g) and passing it in admixture with the second stream of the unconverted gas stream from (f) through a third methanation stage.

2. Process of claim 1 wherein the ratio of the one stream converted in step (c) to the other unconverted stream in step (b) is between 5 : 1 and 1 : 1.

3. Process of claim 1 wherein the two streams from (b) are separately purified, especially desulfurized in step (d) and the residual concentration of carbon dioxide in the converted and washed stream from step (c) is established at less than 3 percent by volume and the carbon dioxide concentration in the other stream is not substantially varied.

4. Process of claim 1 wherein the sum of the compositions of the converted and washed gas stream from (c) and the other stream from (b) satisfies the ratio $H_2/3\ CO + 4\ CO_2 = 0.96$ to 0.99.

5. Process of claim 1 wherein purification step (d) is carried out by washing with organic, absorbing solvents.

6. Process of claim 5 wherein the same solvent is used to purify both of the gas streams in step (b).

7. Process of claim 5 wherein a water-soluble organic polar compound at temperatures less than 0°C is the solvent.

8. Process of claim 5 wherein the solvent is methanol.

9. Process of claim 1 wherein the heat of the reaction in the second and third methanation stages in steps (g) and (h) is removed from the reaction mixture flowing from each stage by indirect heat exchange with boiling water under pressure.

10. Process of claim 1 characterized in that the heat of the reaction in the second and third methanation stages in steps (g) and (h) is removed by indirect cooling of the methanation catalyst with boiling water under pressure.

11. Process of claim 1 wherein the second and/or third methanation stages in steps (g) and (h) are preceded by a layer of a catalyst to convert carbon monoxide with steam to carbon dioxide and hydrogen with an increase in temperature.

12. Process of claim 1 wherein methanation is carried out in all stages on nickel containing catalysts on a ceramic support.

13. Process of claim 1 wherein said first methanation stage (e) comprises a plurality of successive layers of methanation catalyst and portions of said converted stream are fed between successive layers of said catalyst.

* * * * *